United States Patent Office 3,453,063
Patented July 1, 1969

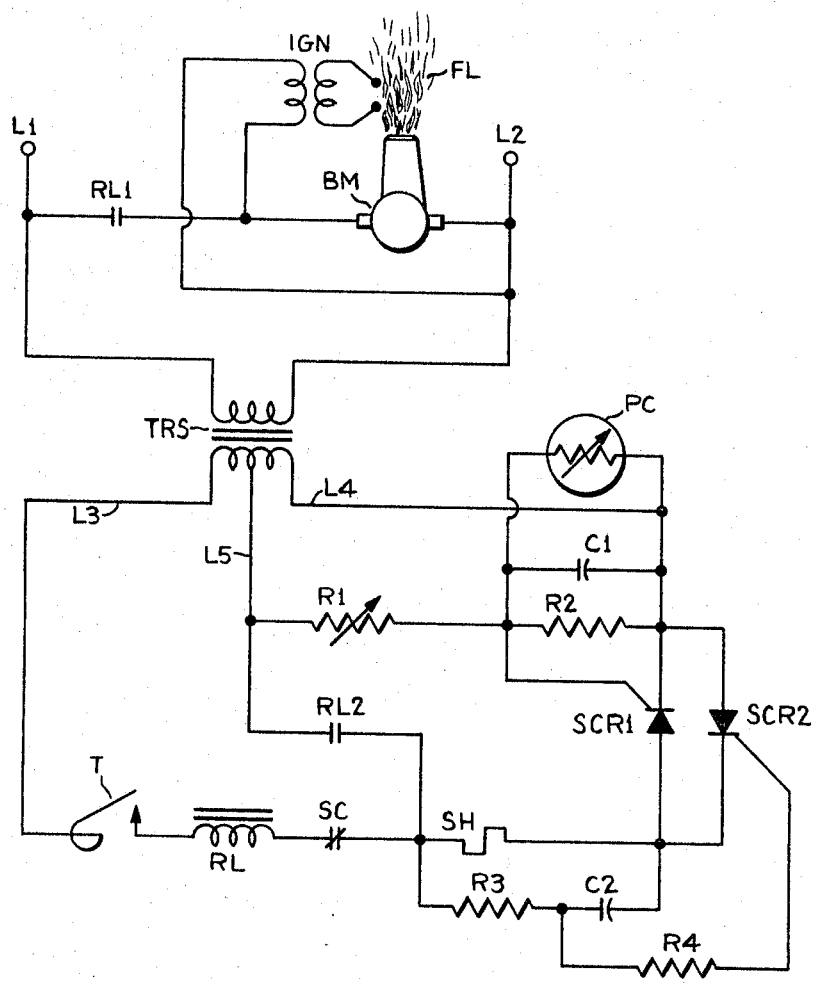

3,453,063
FLUID FUEL BURNER CONTROL UTILIZING SLAVED SILICON CONTROLLED RECTIFIERS
Dwight Charles Lewis, Elkhart, Ind., assignor to Penn Controls, Inc., Oak Brook, Ill.
Filed Oct. 5, 1967, Ser. No. 673,102
Int. Cl. F23n 5/08; F23q 23/00
U.S. Cl. 431—69                                3 Claims

ABSTRACT OF THE DISCLOSURE

A thermostatically operated fluid fuel burner control system in which a thermal safety time switch, including an electrical resistance heater, determines the trial period during which a control relay causes fuel to be fed to the burner in the absence of combustion. Half wave current from an alternating power source is caused to flow through the electrical heater and relay coil by means of a conductive silicon controlled rectifier during the trial period. A second silicon controlled rectifier slaved to the first silicon controlled rectifier and oppositely poled thereto causes the other half wave of current to flow, thereby providing full wave energization of the time switch heater and fuel feeding control relay during the trial period. A photocell, upon detection of the burner flame, provides a low impedance shunt path between the gate and cathode electrodes of the first silicon controlled rectifier. This causes both rectifiers to cease conducting, interrupting current flow through the electrical resistance heater of the thermal time switch signifying successful ignition of the fuel. A self-holding contact of the energized relay then maintains the control relay energized subject to action of the thermostat. Should successful ignition not occur by the end of the trial period, the safety switch actuates interlock contacts in the relay coil energization circuit, locking the system in shut-down condition until the safety switch is manually reset.

---

The invention relates to automatic control systems for fluid fuel burners, which systems include safety means operative to permit the continued supply of fuel to the burner, when there is combustion, and to stop the flow of fuel, if combustion fails to occur within a predetermined time interval during which fuel is supplied, or if combustion has been established and subsequently fails.

In present day fuel burner controls for heating installations safety means control the energization of fuel feeding mechanism in response to a thermostat located in the space being heated. The safety means usually include flame detection means and a timer for timing the interval during which fuel is supplied and at the expiration of which interval, if combustion has not occurred, the burner system is shut down. These controls must be of utmost reliability and quick acting in order to prevent hazardous accumulation of unburned fuel in the burners. Some prior art mechanisms have used solid state flame detectors (such as photocells) in conjunction with silicon controlled rectifiers to provide reliability and speed of operation. For example, in one of these a silicon controlled rectifier is caused to conduct, under conditions where the photocell is dark. Conduction of the silicon controlled rectifier provides a "pull-in" circuit through a warp switch heater and a motor relay coil (or gas valve coil) from an alternating power source. The relay, upon operation, closes self-holding contacts. Should current continue to flow through the warp switch heater for a certain predetermined time without the photocell detecting a flame, the warp switch heater is energized sufficiently to open a pair of interlock contacts, de-energizing the relay circuit and shutting down the system until the warp switch is manually reset. This prevents the accumulation of hazardous fuel in the burner.

Under conditions where the photocell detects flame before the expiration of the warp switch energization time (termed "the trial for ignition period"), the cell resistance is lowered sufficiently to remove a firing signal from the gate electrode of the silicon controlled rectifier, causing the controlled rectifier to cease to conduct through its anode-cathode circuit on the next half wave of the applied power. With such cessation of conduction the circuit through the warp switch heater is interrupted, preventing the warp switch from shutting down the burner system. The system is self-checking since an "open circuit" in the warp switch heater or the controlled rectifier or a "short circuit" of the photocell prevents the motor relay from being energized. A "short circuit" of the silicon controlled rectifier or an "open circuit" of the photocell causes a safety lock-out.

However, in such prior art systems, since the motor relay or gas valve "pulls-in" on half wave rectified direct current, the relay tends to undesirably "chatter" at voltages near its "pull-in" setting. Such chattering sometimes causes the relay contacts to weld closed, removing all safety features of the control. Additionally, half wave energization of the relay produces alternating current "hum" noise which in a central heating system is annoying to a home owner. This is especially true in hot air type installations in which the "hum" is easily carried throughout the home by the air ducts.

It is, therefore, an object of the invention to provide a fuel burner which is of maximum reliability, economical to manufacture and maintain and which is not subject to "chatter" and minimizes "hum" noise.

The invention involves providing two silicon controlled rectifiers in the energizing circuit of the control relay for a fuel burner heating system which is subject to a thermostat located at the space being heated. In such series circuit there is also included a warp switch heater and its interlocking normally closed safety switch contacts to provide a "trial for ignition." A photoconductive cell is shunted across a resistor-capacitor parallel network connected across the gate-cathode electrodes of a first one of the silicon controlled rectifiers. With the photocell dark and the thermostat calling for heat, sufficient potential is developed across the resistor-capacitor network to bias the first silicon controlled rectifier to fire through its anode-cathode circuit, causing the control relay to be energized. The relay closes self-holding contacts in a lower power circuit subject to the interlock safety contacts of the warp switch. Upon operation of the first silicon controlled rectifier through its anode-cathode circuit, the second silicon controlled rectifier (which is oppositely poled and in shunting relation thereto) is also caused to conduct by the signal applied to a capacitor connected in its gate-cathode circuit. The second silicon controlled rectifier, therefore, is "slaved" to the first silicon controlled rectifier and will conduct on the next negative half cycle of the applied alternating power only under conditions where the first silicon controlled rectifier is first caused to conduct during the positive half cycle.

Under conditions where the photocell sees flame, as after successful ignition of the fuel, it "shorts" the gate-cathode circuit of the first silicon controlled rectifier, preventing it from re-conducting at the next positive half cycle of the applied current. With such cessation of conduction of the first silicon controlled rectifier, the second silicon controlled rectifier (slaved thereto) is also prevented from conducting. This stops current flow through the warp switch heater. Under conditions where successful ignition does not occur and the photocell remain dark, the warp switch heater is energized sufficiently to cause by its interlock contacts a shut down of the burner system.

With this arrangement both the negative and the positive half cycles of the applied alternating power are utilized through the warp switch heater and the relay, causing the relay to "pull-in" clearly at a definite voltage without chatter. This substantially eliminates the danger of the relay contacts welding closed. Additionally, alternating current "hum" noise of the relay is minimized. The subject control is self-checking. An open circuit in the warp switch heater or silicon controlled rectifier or a shorted photocell prevents the control relay from operating, while a short circuited rectifier or an open circuit of the photocell causes a safety lock-out.

Features and advantages of the invention will be seen from the above, from the following description of operation of the preferred embodiment when considered in conjunction with the drawing and from the appended claims.

In the drawing is shown a simplified schematic wiring diagram of a fuel burner control system including a diagrammatic representation of a motor driven oil burner, embodying the invention.

With reference to the drawing, alternating power from any convenient source (not shown) is applied to the circuitry over supply lines L1, L2. A step-down transformer TRS applies approximately 17 volts alternating power over lines L3 and L4 connected to opposite ends of the secondary winding of the transformer. In the circuitry, resistors are generally designated R and capacitors C with suffix numerals added to differentiate one from the other. T designates a thermostat of the snap acting bimetallic type which is positioned in the space (not shown) to be heated.

For simplicity, the circuit is shown for controlling an oil burner, comprising a burner motor BM for propelling fuel into a furnace (not shown) for ignition by an igniter IGN. The ignited fuel is indicated as a flame FL. A photocell designated PC is positioned for detecting the burning fuel FL. The cell is of the photoconductive type which has a relatively high resistance to electrical current flow when it is dark, which resistance is reduced substantially, when light impinges upon the cell.

The burner motor BM and igniter IGN are connected directly across supply lines L1, L2 subject to normally open contacts RL1 of an operating relay RL. The coil of relay RL is connected in series with thermostat T and a pair of normally closed contacts SC of a safety switch SH. Switch SH is of the warp heater type which includes a heater resistance SH and is designed to open normally closed contacts SC after current flow through the heater resistor SH has generated a certain amount of heat. Switch contacts SC must then be manually reset closed. Relay RL is also equipped with a pair of contact RL2 normally open and connected by line L5 to a tap on the secondary winding of transformer TRS to provide a self-holding circuit through coil RL for the relay.

A pair of silicon controlled rectifiers designated SCR1 and SCR2 and both of the C106F2 type are provided. The rectifiers each have anode, cathode and gate electrodes. First rectifier SCR1 is connected in series with thermostat T, coil RL, normally closed contacts SC of the safety switch and resistance heater SH across the secondary winding of transformer TRS via lines L3 and L4. A capacitor C1 is connected between the cathode and gate electrodes of rectifier SCR1 in parallel with a biasing resistor R2 to prevent transients from firing the rectifier. Also connected across the cathode and gate electrodes of rectifier SCR1 is photocell PC. Firing voltage is applied to the gate circuit of rectifier SCR1 through adjustable resistor R1 over line L5.

Connected in shunting relationship across safety switch resistance heater SH is a resistor-capacitor timing circuit R3 and C2. Second rectifier SCR2 is connected across the anode-cathode electrodes of first rectifier SCR1 but oppositely poled thereto. The gate electrode of second rectifier SCR2 is connected through a current limiting resistor R4 to the junction of capacitor C2 and resistor R3 for supplying a firing voltage to the gate electrode of rectifier SCR2 under conditions where first rectifier SCR1 conducts through its anode-cathode circuit which includes resistance heater SH.

In operation, assume that with power supplied to the circuitry of FIGURE 1, thermostat T engages its contacts, calling for heat. This prepares an energizing circuit for coil RL of the burner operating relay. Power is also supplied through adjustable resistor R1 to biasing R2 and capacitor C1 in the gate-cathode circuit of silicon controlled rectifier SCR1. During the positive half cycle of the applied power capacitor C1 charges sufficiently to provide a firing signal at the gate electrode of rectifier SCR1, causing the rectifier to conduct through its anode-cathode circuit. This completes an energizing circuit for coil RL of the operating relay; the circuit extending from one side of the secondary winding of transformer TRS over line L3 through thermostat T (presently closed), coil RL, normally closed safety switch contacts SC, safety switch heater SH and the anode-cathode circuit of rectifier SCR1 to the other side of the secondary winding of the transformer TRS over line L4.

Relay RL operates, engaging its contacts RL1, thereby energizing igniter IGN and burner motor BM to supply fuel to the furnace and to ignite it. Relay RL also closes its contacts RL2, providing a reduced power self-holding circuit subject to safety switch contacts SC.

Silicon controlled rectifier SCR1 conducts each positive half cycle of the applied power, causing current to flow through safety switch heater SH in its anode-cathode circuit. This heats the safety switch but without immediate effect.

The voltage drop across warp switch resistance heater SH is impressed across the resistor-capacitor (R3, C2) network, charging capacitor C2 each half cycle that rectifier SCR1 conducts. During the negative half cycles of the applied power, capacitor C2 discharges through the gate circuit of rectifier SCR2, causing this rectifier also to conduct through its anode-cathode circuit, thereby maintaining an energizing circuit for coil RL of the burner operating relay.

It may be noted that silicon controlled rectifier SCR2 will fire and conduct only if rectifier SCR1 has first conducted the previous half cycle. This may be termed "slaved operation" of rectifier SCR2. Such operation causes relay RL to be energized with sufficient power to operate positively and not chatter even at threshold operating voltage conditions.

Next assume that ignition of the fuel is successful, providing a flame FL which is detected by photocell PC. The cell resistance is substantially reduced, providing a low impedance shunt path across the gate-cathode electrodes of rectifier SCR1. This maintains capacitor C1 in discharged condition the next positive half cycle of applied power, preventing refiring of rectifier SCR1. Under such conditions, both rectifiers SCR1 and SCR2 return to and are maintained in nonconducting condition. However, relay RL is maintained energized through its self-holding contacts RL2 subject to thermostat T.

The burner system will continue combustion of the fuel supplying heat to the space being heated (not shown) until the demand for heat by thermostat T is satisfied.

Next assume that in the previous example the ignition attempt instead proved unsuccessful, the fuel failing to be ignited by igniter IGN. Under such conditions, rectifiers SCR1 and SCR2 continue their repetitive conduction, causing continued current flow through safety switch heater resistor SH. After a certain time, this current flow causes sufficient heat to be generated in the safety switch to actuate the normally closed switch contacts SC to open condition. Contacts SC, upon opening, interrupt the energization circuit for coil RL of the burner operating relay. Relay RL releases, reopening its contacts RL1 and RL2, stopping the attempt to ignite the fuel and fuel feeding by the burner motor. This shuts down the system. It is noted that manual reset (not shown) of the safety warp switch is required to restart the system.

It is seen by inspection of the circuit that an "open circuit" of the heater resistor SH, or of either of the silicon controlled rectifiers SCR1, SCR2 or a "short circuited" photocell PC prevents relay RL from "pulling-in." A short circuited rectifier (SCR1, SCR2), or an open circuit of photocell PC causes a safety lock-out of the system at the expiration of the trial period whether or not combustion occurs.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. An electrical control for the operation of a fluid fuel burner comprising,
   a source of alternating power,
   fluid fuel feeding means selectively energizable from said power source,
   fuel igniter means also selectively energizable from said power source,
   relay means including an energizing coil and being operative for controlling energization of said fuel feeding means and said igniting means,
   thermostat means responsive to the ambient temperature in a space to be heated by said burner and being connected in series circuit with the coil of said relay means for controlling energization thereof,
   a normally closed safety switch including a resistance heater, said switch being actuated open when sufficiently energized by current flow therethrough,
   said relay including self-holding contact means connected for providing a holding circuit for said relay coil subject only to said thermostatic means and said safety switch,
   said resistance heater being connected in series with said relay coil and thermostatic means,
   a first silicon controlled rectifier having anode-cathode and gate electrodes, the anode-cathode circuit of said first silicon controlled rectifier providing an energizing circuit for said relay coil and safety switch heater through said thermostat and across said power source,
   firing circuit means for said first silicon controlled rectifier interconnected to its gate-cathode circuit for causing conduction of said first rectifier through its anode-cathode circuit each positive half cycle of the applied power,
   characterized in that there is provided:
   a second silicon controlled rectifier having anode-cathode and gate electrodes,
   said second silicon controlled rectifier being connected with its anode-cathode circuit shunting the anode-cathode circuit of said first rectifier but oppositely poled thereto,
   second firing circuit means for said second silicon controlled rectifier connected for energization from the anode-cathode circuit of said first silicon controlled rectifier for causing conduction of said silicon controlled rectifier through its anode-cathode circuit only under conditions where said first silicon controlled rectifier has first been caused to conduct for providing full wave energization of said resistance heater and said relay coil, and
   impedance means connected across said gate-cathode electrodes of said first silicon controlled rectifier and responsive to the presence of combustion of said fuel at said burner,
   said impedance means providing a high impedance path between said gate and cathode electrodes of said first rectifier under conditions where combustion is not detected and providing a low impedance shunt path from said gate to said cathode electrodes preventing firing of said first rectifier, under conditions where combustion is detected.

2. A control as set forth in claim 1 wherein said combustion responsive impedance means is a photoconductive cell positioned for detecting combustion of said fuel.

3. A control as set forth in claim 1 wherein said firing circuit means for said second silicon controlled rectifier includes a resistor-capacitor timing circuit connected across said resistance heater and to the gate electrode of said second rectifier for applying a firing pulse thereto by discharging of its said capacitor.

References Cited

UNITED STATES PATENTS 3,113,198  12/1963  Shinn.
3,276,507  10/1966  Eldridge et al. _____ 431—69

FREDERICK L. MATTESON, JR., *Primary Examiner.*

ROBERT A. DUA, *Assistant Examiner.*

U.S. Cl. X.R.

323—24; 431—24